US008335230B2

(12) United States Patent
Saigo

(10) Patent No.: US 8,335,230 B2
(45) Date of Patent: Dec. 18, 2012

(54) BROADBAND RADIO CONNECTION COMMUNICATION DEVICE

(75) Inventor: Tomozumi Saigo, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 12/143,571

(22) Filed: Jun. 20, 2008

(65) Prior Publication Data

US 2008/0317067 A1    Dec. 25, 2008

(30) Foreign Application Priority Data

Jun. 21, 2007   (JP) ................................ 2007-163805

(51) Int. Cl.
*H04B 7/212* (2006.01)
(52) U.S. Cl. ....................................... 370/443; 370/252
(58) Field of Classification Search .................. 370/252
See application file for complete search history.

(56) References Cited

U.S. PATENT DOCUMENTS

| | | | | |
|---|---|---|---|---|
| 2004/0259545 | A1* | 12/2004 | Morita ........................ | 455/435.1 |
| 2006/0034397 | A1* | 2/2006 | Lee et al. ...................... | 375/340 |
| 2006/0146863 | A1* | 7/2006 | Spinar et al. .................. | 370/449 |
| 2007/0091998 | A1* | 4/2007 | Woo et al. ................. | 375/240.02 |
| 2008/0285500 | A1* | 11/2008 | Zhang et al. .................. | 370/315 |
| 2009/0196180 | A1* | 8/2009 | Bahl et al. ..................... | 370/235 |
| 2009/0275353 | A1 | 11/2009 | Fujita et al. | |

FOREIGN PATENT DOCUMENTS

| | | |
|---|---|---|
| JP | 11-055731 | 2/1999 |
| JP | 11-252663 A | 9/1999 |
| JP | 2000-295650 | 10/2000 |
| JP | 2006-332753 A | 12/2006 |
| WO | WO 2005/041609 | 5/2005 |

OTHER PUBLICATIONS

Japanese Office Action mailed Feb. 7, 2012 for corresponding Japanese Application No. 2007-163805, with English-language translation.

* cited by examiner

*Primary Examiner* — Mark Rinehart
*Assistant Examiner* — Matthew Hopkins
(74) *Attorney, Agent, or Firm* — Fujitsu Patent Center

(57) ABSTRACT

The communication device extracts frame data originated by the base station and obtains the parameters of using bandwidth, stored in the header of the frame data. Free bandwidth is calculated by subtracting an already used band from the full band of the base station. It is determined whether the free band can accommodate the band that its own terminal desires to use. If it can be accommodated, a network entry sequence is run in order for the terminal to communicate with the base station since communications with the base station is available.

15 Claims, 11 Drawing Sheets

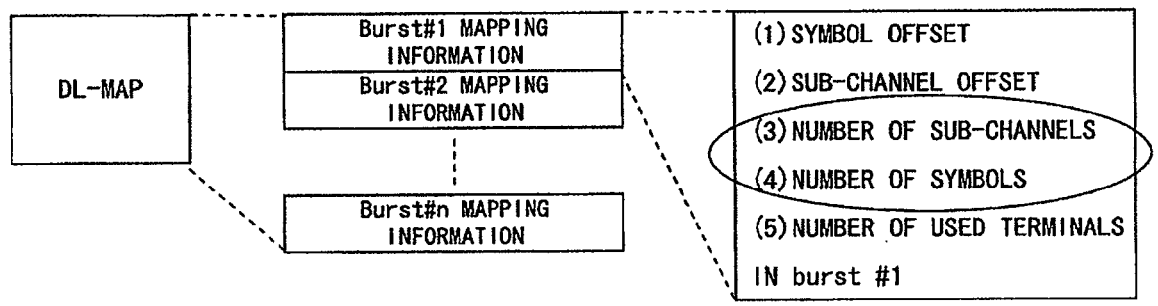
F I G. 6

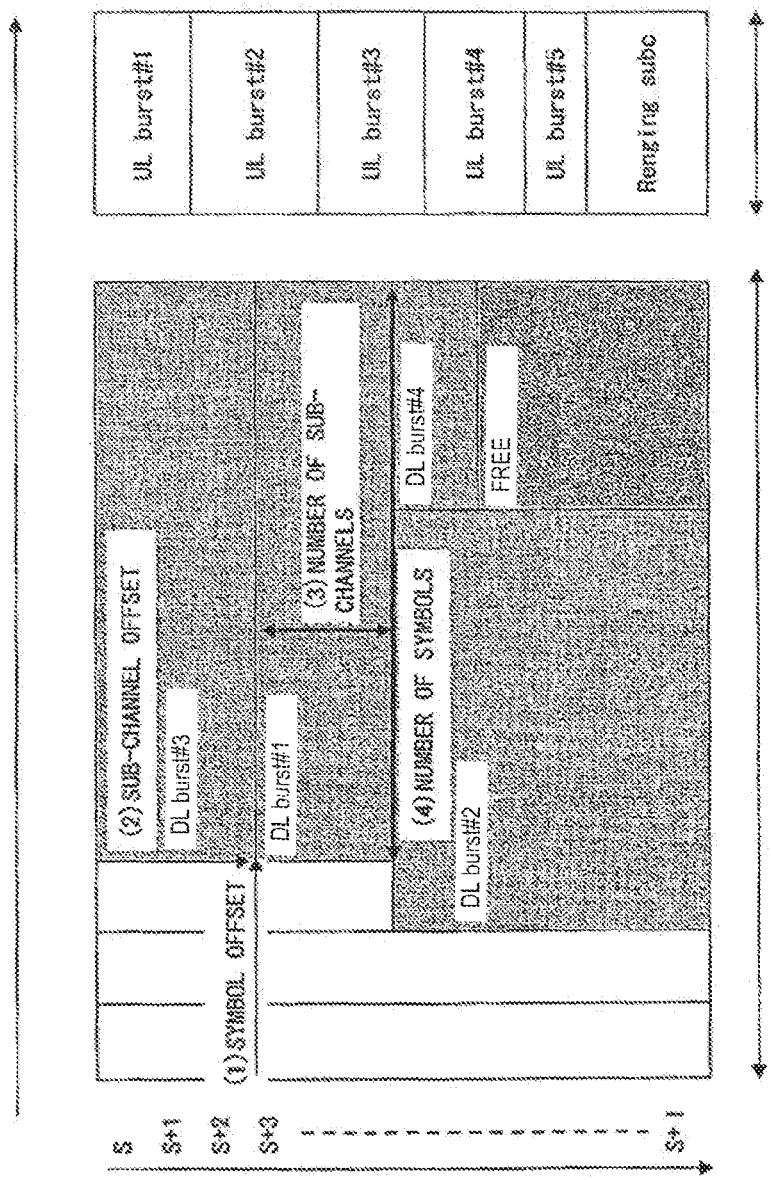
F I G. 7

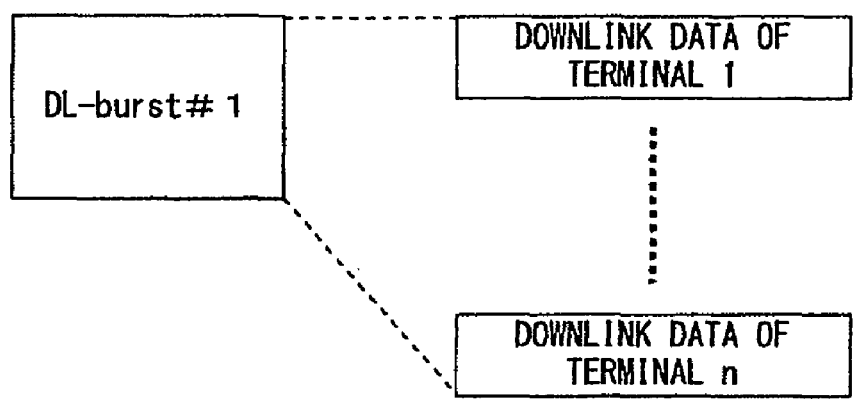
F I G. 8

BROADBAND RADIO CONNECTION COMMUNICATION DEVICE

BACKGROUND

1. Field

The embodiments discussed herein are directed to a communication device using an orthogonal frequency division multiplexing (OFDM (including OFDMA)) (hereinafter called "OFDMA") method.

2. Description of the Related Arts

Recently, the development of a communication system under the background of a technology standardized by WiMAX (IEEE802.16e) has been promoted. In IEEE802.16e sequence, the power saving before initial ranging is not especially taken into consideration in a network entry operation. In the connection sequence with a base station, a terminal unconditionally starts a network entry operation after the completion of synchronization. Since this network entry operation is started regardless of a band that a terminal after network entry desires to use. Therefore, if the band that is desired to actually use cannot be used after entry, the terminal must either wait for until the band becomes able to be used or be disconnected. If the terminal is disconnected, power used in the initial ranging operation so far performed is wasted. If origination and disconnection are repeated until the desired band can be secured, the resources of the base station must also share the load.

FIG. 1 explains the problem of the present WiMAX.

It is assumed that terminals 2~n are accommodated in the base station A and its radio resources are fully used. Since the radio resources of the base station A are overcrowded, terminal 1 cannot communicate with the base station A even if terminal 1 enters from the outside and attempts to communicate with the base station A. However, according to the present WiMAX specification, terminal 1 performs all the network operations for the base station A and after entry terminal 1 checks whether it can use a desired band in order to communicate with the base station A. Therefore, if the desired band cannot be used, terminal 1 must either abandon communications with the base station A or wait for until the desired band can become able to be used. However, all the network entry operations must be performed in order to determine whether terminal 1 can communicate with the base station A. Therefore, if the communication is impossible, the network entry operations are wasted to lead to extra power consumption.

FIG. 2 explains the prior art.

Patent Document 1 discloses a technology for reducing a time needed from origination to connection by transmitting information known by the base station side to a terminal side and Patent Document 2 discloses a technology for regularly receiving information (used throttle information) from the base station and using the information as the trigger of terminal origination on the terminal side. However, in order to realize this, in either method the base station side have to not only have a mechanism for transmitting its intra-office state to the terminal side and also the terminal and base station sides share network entry sequence.

FIG. 3 is a sequence chart of the network entry sequence.

The base station transmits a frame towards terminals in its own cell every 5 msec. First, a down link (DL) frame is transmitted. Upon receipt of the DL frame, a terminal performs synchronization (synchronization between the base station and the terminal) to enable the decoding of its frame data (1). Then, an initial ranging process is performed between the terminal and the base station (2). This is the adjustment control process of transmitting power and the like between the base station and the terminal. Then, basic capability is obtained between the base station and the terminal (3). Specifically, the capability of a physical layer (transmitting power, FEC, etc.) is exchanged with each other between the base station and the terminal. Then, each of the base station and the terminal runs an authorization sequence (4) in order to decode data transmitted from the opposite party to exchange their decoding keys. Then, the terminal notifies the base station of its terminal MAC layer-connected function and it is notified of a formal connection ID by the base station (5). Then, the terminal obtains an IP address (6) and performs service flow control, such as connection control, QOS control and the like, in order to for exchange user data (7) and starts a communication service.

If it is determined in the service flow control that the base station and a terminal cannot communicate with each other, a communication service cannot be provided. Therefore, the operations (1)~(7) are wasted and extra power is consumed.

Patent Document 1: Japanese Patent Application Publication No. 2006-332753

Patent Document 2: Japanese Patent Application Publication No. H11-252663

However, if the origination itself of the terminal side is controlled by information provided by the base station side, it is necessary for the base station side to monitor the number of terminals and the number of available bands for each OFDMA frame and to store the information in the management area of the OFDMA frame. It is also necessary to extract the information for each frame on the terminal side, to run network entry sequence until receiving a frame from the base station and to synchronize the base station side service with the terminal side service. Although for this purpose it is necessary to unify these services between a different base station vender and a different terminal vender, there are many technical problems in synchronizing this specification and mounting them although they are already technically standardized.

SUMMARY

It is an aspect of the embodiments discussed herein to provide a communication device for conducting radio communications with a base station, including: a use bandwidth setting unit for setting bandwidth that the communication device itself desires to use; a free bandwidth calculation unit for calculating free bandwidth on the basis of full bandwidth used by the base station and bandwidth currently used to communicate with terminals accommodated in the base station, which are extracted from a header of down link data from the base station; a determination unit for determining whether the bandwidth that the communication device itself desires to use is equal to or less than the free bandwidth; and a registration unit for registering the bandwidth that the communication device itself desires to use in a network in the base station if the desired bandwidth is equal to or less than the free bandwidth.

According to the present invention, a communication system which does not consume extra power even if a terminal cannot communicate with the base station may be provided. These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 explains a DL-MAP.
FIG. 7 explains the DL-MAP information and used band of burst #1.
FIG. 8 explains the configuration in the DL-burst.

DESCRIPTION OF THE EMBODIMENTS

The present embodiment provides a mechanism capable of calculating the number of terminals within the base station and used bands on the basis of only information obtained on the terminal side. It also provides a mechanism capable of selecting origination conditions on the terminal side on the basis of the obtained information without relying on the base station.

OFDMA regularly transmits a frame from the base station to terminals every 5 msec. When originating, it is necessary for the terminal side to receive and synchronize these frames and to decode data. The present embodiment includes: a function to decode data after synchronizing them; a function to calculate the number of terminals and bands in the frame on the basis of the decoded DL-MAP information; a function to anticipate the amount of the remaining communication band in the frame on the basis of the calculated result and to determine whether the service that the terminal itself desires to use is available on the basis of the information about the anticipated number of the remaining bands and the number of terminals; and a function to notify a terminal user of the obtained information and a function to preset the band that the terminal user desires to use.

By receiving a frame transmitted every 5 msec from the base station on the terminal side and calculating the number of used bands and terminals in the frame on the basis of the received frame, the maximum allowable amount of band of the frame of the base station can be calculated. By subtracting the number of used bands from the maximum allowable amount of band, the number of the remaining available bands can be calculated. If the amount of available band is larger than the amount of band that the terminal itself desires to use, normal origination sequence can be run. If the amount of available band is less than the amount of band that the terminal itself desires to use, either the connection must be cut by the base station or the terminal itself must cut the connection by itself since the service that its own terminal requests cannot be received even if origination sequence after that is run and a network entry process is performed between the base station and the terminal itself. Therefore, the power consumption of the terminal used to run these sequences is large and wasted. Therefore, in the present embodiment these sequences are prevented from running. By analyzing the OFDMA frame obtained on the terminal side without utilizing information about the base station, anticipating the amount of available band in the base station, determining whether the service can be provided and displaying and noti- fying a terminal user of the information, useless origination operations are prevented and the user can originate only when the terminal can be used. By presetting the number of bands that a user desires to use, the user can determine whether the service that a user desires to receive can be used.

Figure 1:
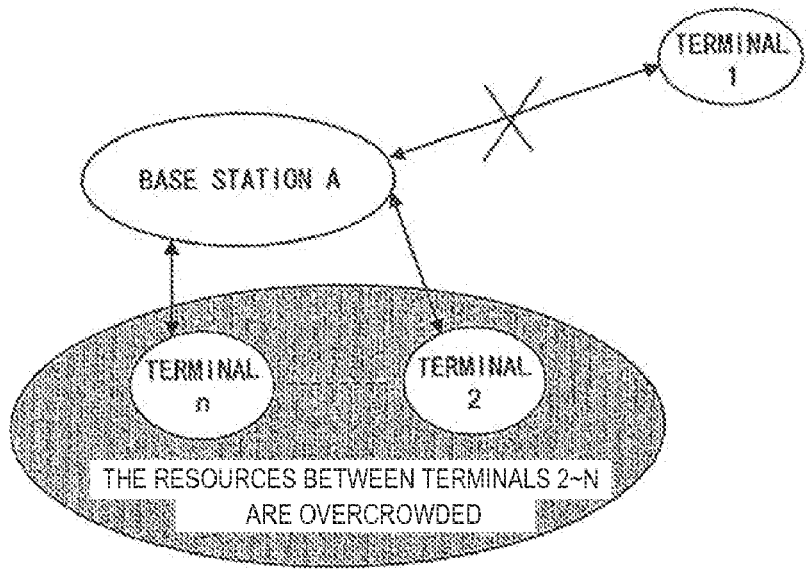
FIG. 1 explains the problem of the present WiMAX.
Figure 2:
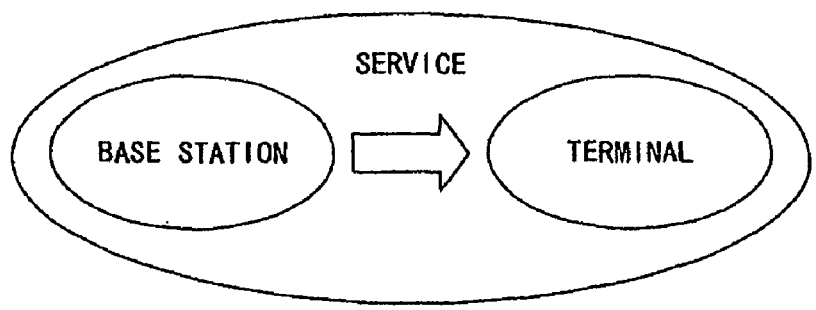
FIG. 2 explains the prior art.
Figure 3:
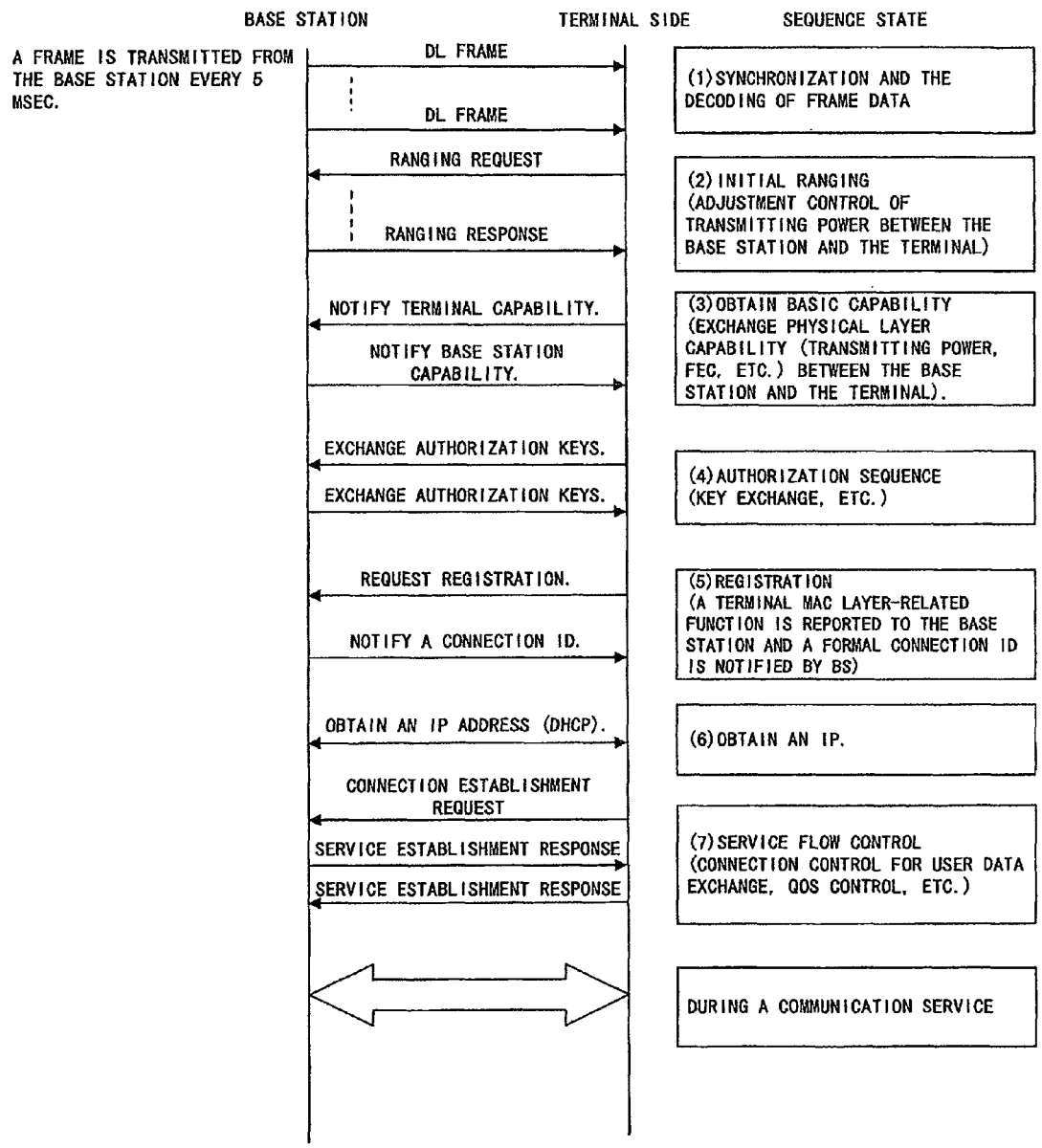
FIG. 3 is a sequence chart of the network entry sequence.
Figure 4:
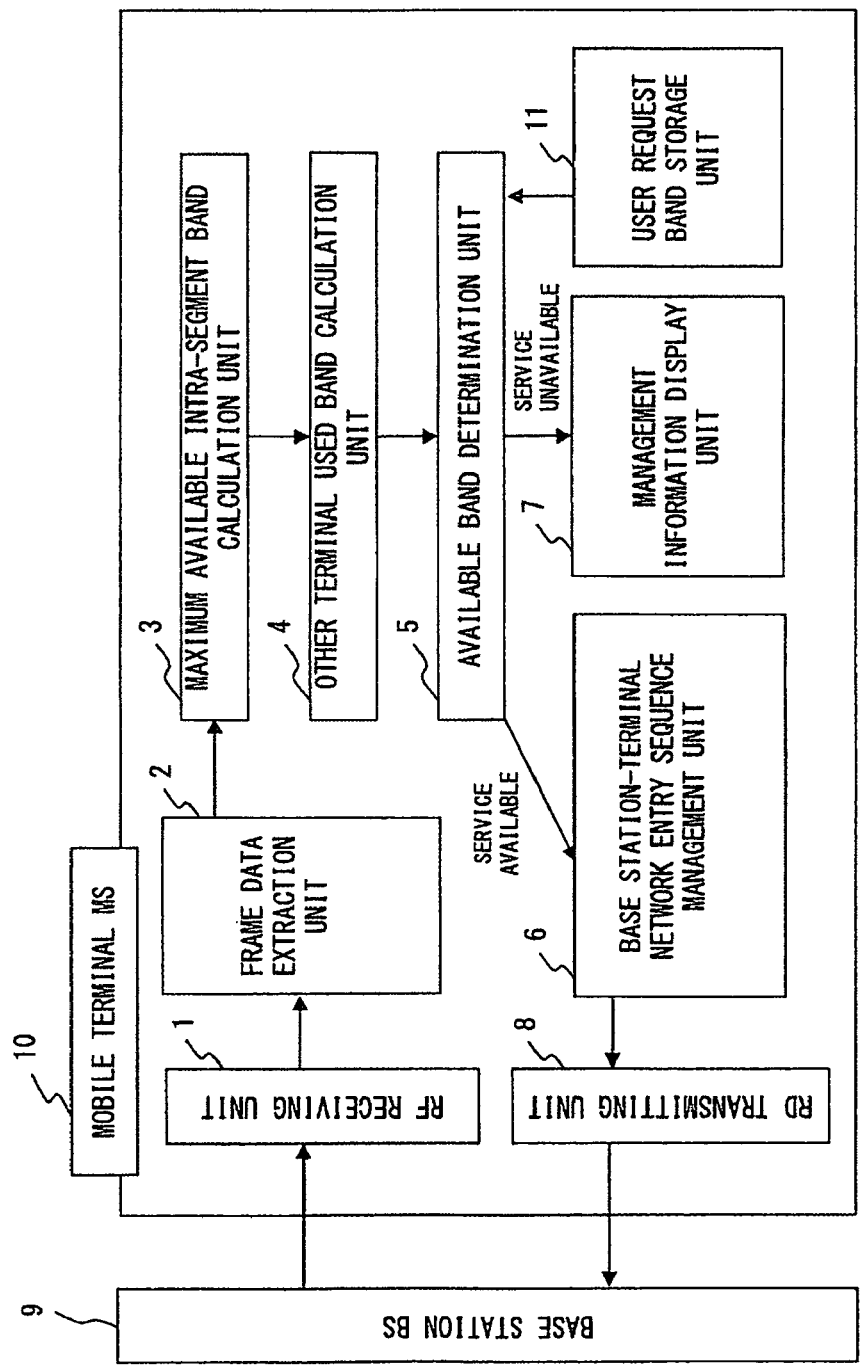
FIG. 4 shows the configuration of the mobile terminal in the preferred embodiment.

FIG. 4 shows the configuration of the mobile terminal in the preferred embodiment.

A mobile terminal user presets the number of bands that the user desires to use in a user request band storage unit 11. Before originating a call, firstly the terminal receives an OFDMA frame from the base station 9. The DL-MAP and DCD data frame of OFDMA are regularly transmitted. An RF receiving unit 1 receives the frame, performs frame synchronization and if data can be decoded, it transfers the data to a frame data extraction unit 2. The frame can be read by the frame data extraction unit 2 and all parameters needed to calculate a used band area are extracted from the DL-MAP. A intra-segment maximum available band calculation unit 3 and an other terminal used band calculation unit 4 calculate the intra-segment maximum available band and other terminal used bands, respectively, using the extracted parameters. The calculation result is transferred to an available band determination unit 5 and it is determined whether the desired band can be used on the basis of the number of desired bands stored in a user request band storage unit 11. If it is determined that the service can be provided, control is transferred to a base station-terminal network entry sequence management unit 6 and a network entry sequence is run. If it is determined that the service cannot be provided, a management information display unit 7 displays origination impossibility and the present number of used terminals and the present amount of used band in the base station. An RF transmitting unit 8 transmits signals from a mobile terminal 10 to the base station 9.

Figure 5:
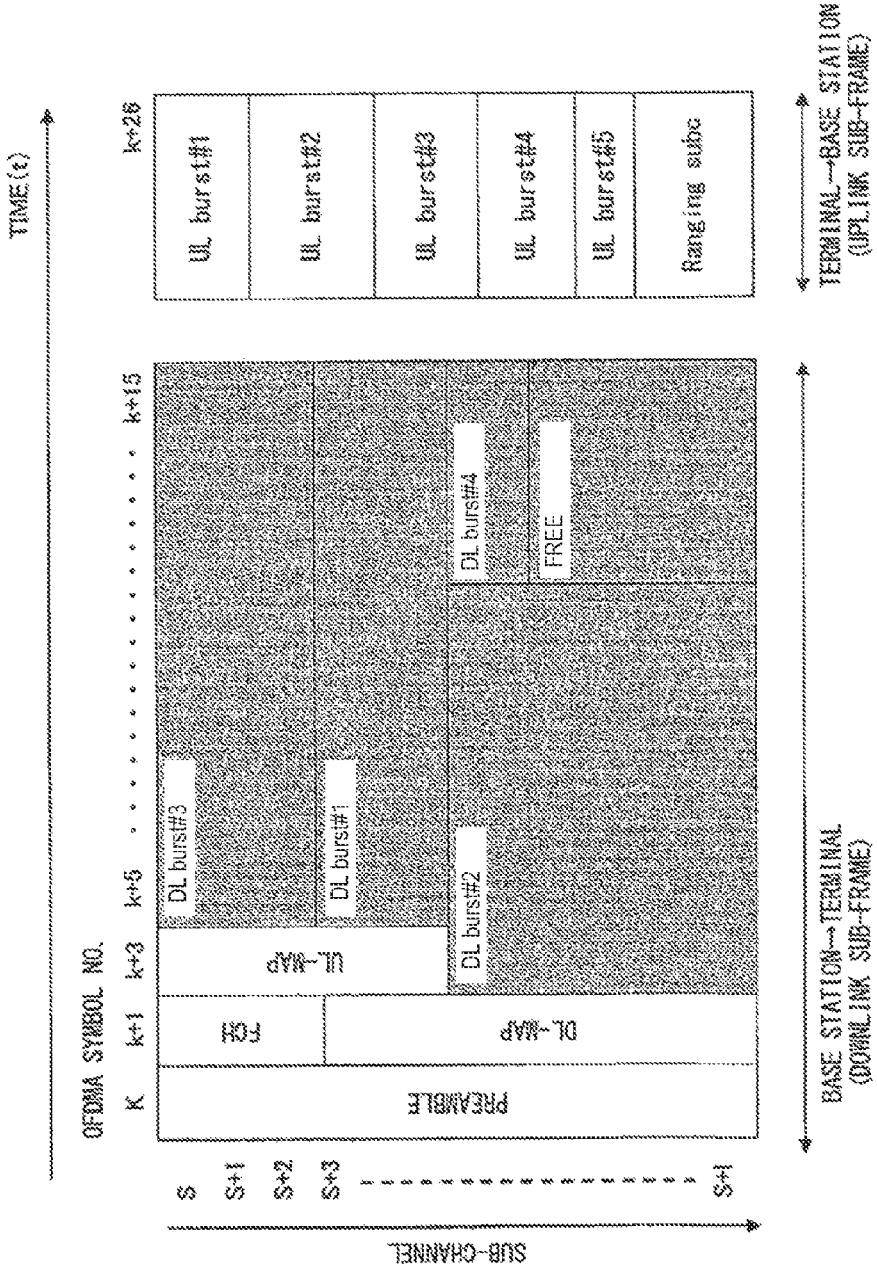
FIG. 5 explains the frame configuration of OFDMA.

FIG. 5 explains the frame configuration of OFDMA.

Preamble is a signal for synchronization establishment. In the data communication of Ethernet (registered trademark), 64-bit data in which 1 and 0 are alternately arrayed and which ends with two continuous bits of 1 is transmitted from the transmitting source node to a destination node before transmitting a frame in order to notify other nodes of the transmission of data. This is called "preamble". The receiving node catches timing by the repetition of the data of 1 and 0 and knows the beginning of the frame by data which ends with two continuous bits of 1. This is usually used for frame synchronization.

FCH is the abbreviation of frame control header and includes information about the number of sub-channels used in the frame. DL-MAP is the abbreviation of down link map and includes the mapping information of downlink (base station→terminal side) burst data. UL-MAP is the abbreviation of up link map and includes the mapping information of uplink (terminal side→base station) burst data. The combination of FCH, DL-MAP and UL-MAP is usually called the head of a frame. UL-burst is the abbreviation of up link burst data and it is uplink data. Ranging subc is the abbreviation of ranging sub-channel and is a control signal used to prevent a channel to be used by the terminal itself from becoming the same as that of another terminal when the terminal side originates a call to the base station. A sub-channel is a channel assigned for each frequency of OFDMA. In the case of WiMAX, an FFT size is 512 ch~2048 ch. This corresponds to the vertical axis of the frame configuration shown in FIG. 5. A symbol number is the unit of a modulation signal used when mounting information (BIT) on a radio wave and the number of mounted BIT on one symbol varies depending on a modulation method. The horizontal axis of the frame configuration shown in FIG. 5 indicates the number of symbols.

A frame is transmitted every 5 msec from the base station to the terminal. The number of all bands distributable from the base station to the terminals is the number of sub-channels (S)×the number of symbols (K)−((DL-MAP)+(UL-MAP)+FCH+Preamble), which is the meshed part of FIG. 5. Each DL-burst is assigned by the condition in the sector of the base station. In the example shown in FIG. 5, the DL-bursts are assigned to four areas. Generally, an encoding method is different for each DL-burst. The area of each of the burst #1~#n is sequentially calculated according to the information in the DL-MAP. The area of each burst is calculated by the number of sub-channels×the number of symbols. DL-MAP includes information needed to calculate the area of each burst.

FIG. 6 explains a DL-MAP.

As shown in FIG. 6, DL-MAP stores mapping information for each burst. Each piece of mapping information comprises symbol offset (1), sub-channel offset (2), the number of sub-channels (3), the number of symbols (4) and the number of used terminals in the corresponding burst. By extracting and multiplying the number of sub-channels (3) and the number of symbols (4), of these, the used bands of the burst can be known.

FIG. 7 explains the DL-MAP information and used band of burst #1.

FIG. 7 shows an OFDMA frame. Which part in the frame of the down link burst #1 uses can be known from the information of DL-MAP. The number of symbols at which the left top end of the band of burst #1 begins can be known from the symbol offset (1). The number of sub-channels at which the left top end of the band of burst #1 begins can be known from the sub-channel offset (2). Then, the number of sub-channels (3) and the number of symbols (4) indicate the width in the sub-channel direction of the used band of burst #1 (vertical width in FIG. 7) and the width in the symbol direction of the used band of burst #1 (horizontal width in FIG. 7), respectively. Thus, by specify a used band for each burst, totaling the number of bands (band width) of all the bursts and subtracting the total from the number of all the bands (all the bandwidth), the number of free bands (areas) can be known.

FIG. 8 explains the configuration in the DL-burst.

DL-bursts are provided for the number of bursts and the DL-burst of each burst stores the down data of all the terminals accommodated in the burst.

Figure 9:
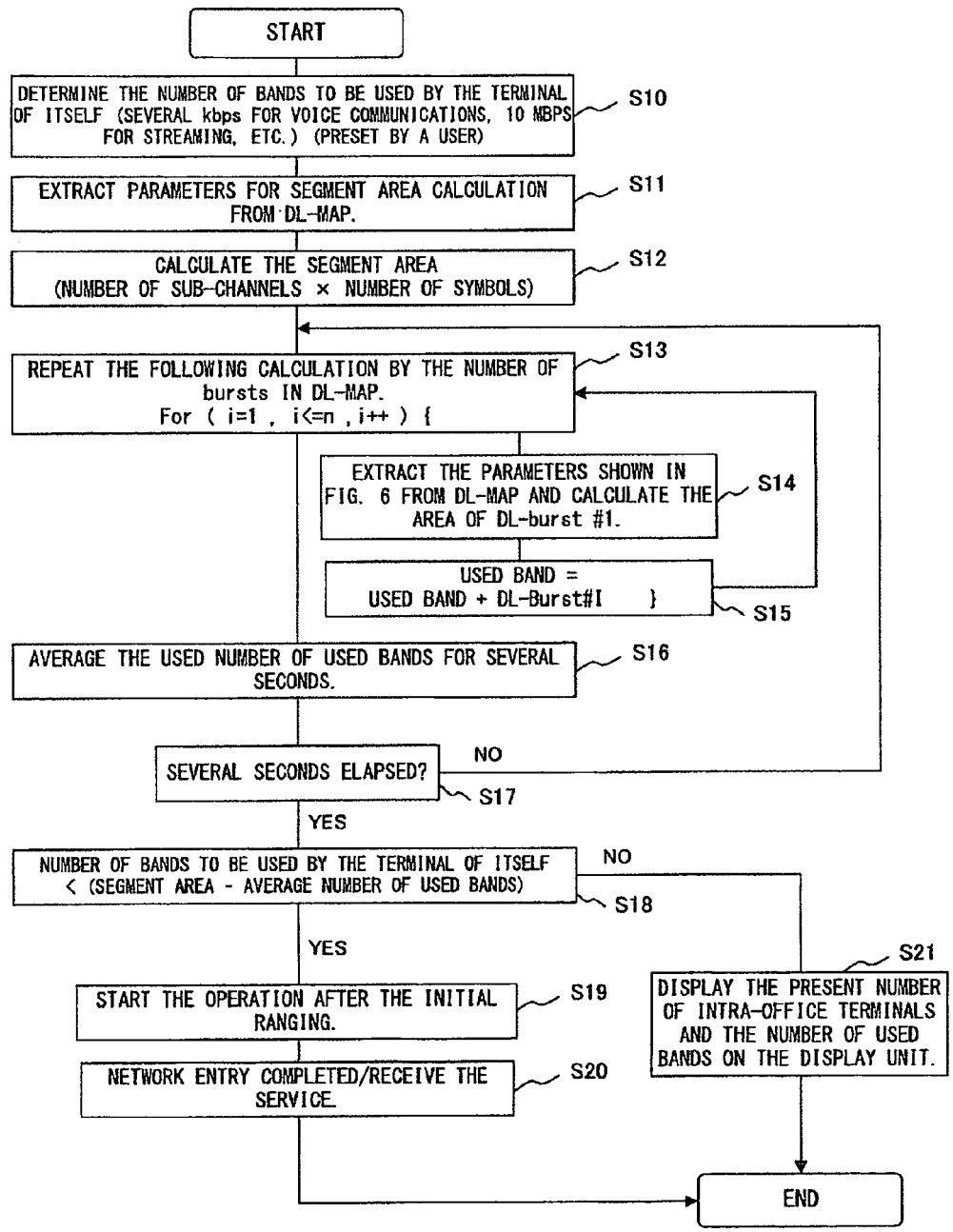
FIG. 9 shows the process flow according to the preferred embodiment on the terminal side.

FIG. 9 shows the process flow according to the preferred embodiment on the terminal side.

In step S10, a user arbitrarily presets the anticipated number of used bands of the terminal itself, for example, several kbps for voice communication, 10 Mbps for streaming and the like. In step S11, parameters are extracted from DL-MAP in order to calculate the frame area of a segment used by the base station attempting to communicate. A segment means a band assigned to a certain base station, of all the bands of OFDMA. In step S12, the area of the segment is calculated by the number of sub-channels×the number of symbols from the obtained parameters. Then, in step S13 a loop of repeating steps S14 and S15 by the number of bursts included in DL-MAP is started. In step S14, the parameters shown in FIG. 6 are extracted from DL-MAP and the area of the DL-burst of one burst is calculated. In step S15, the calculated area of the DL-burst is added to the used band. If in step S13 it is determined the process for the number of bursts is completed, in step S16 the average for several seconds of the number of used bands is calculated. In step S17, it is determined whether several seconds have elapsed. If several seconds have not elapsed, the flow returns to step S13. If it is determined that several seconds have elapsed, the flow proceeds to step S18. Although the length of time needed to average it is several seconds here, a specific number of seconds should be appropriately determined by a person having ordinary skill in the art. In step S18 it is determined whether the anticipated number of bands to be used by the terminal itself is smaller than one obtained by subtracting the average used bands from the segment area. If the determination in step S18 is no, in step S21 the present number of intra-station terminals and the number of used bands are displayed on the display unit of the mobile terminal and the process is terminated. If the determination in step S18 is yes, in step S19, operations after the initial ranging is started and in step S20 the network entry is terminated and the radio communication service is started.

Figure 10:
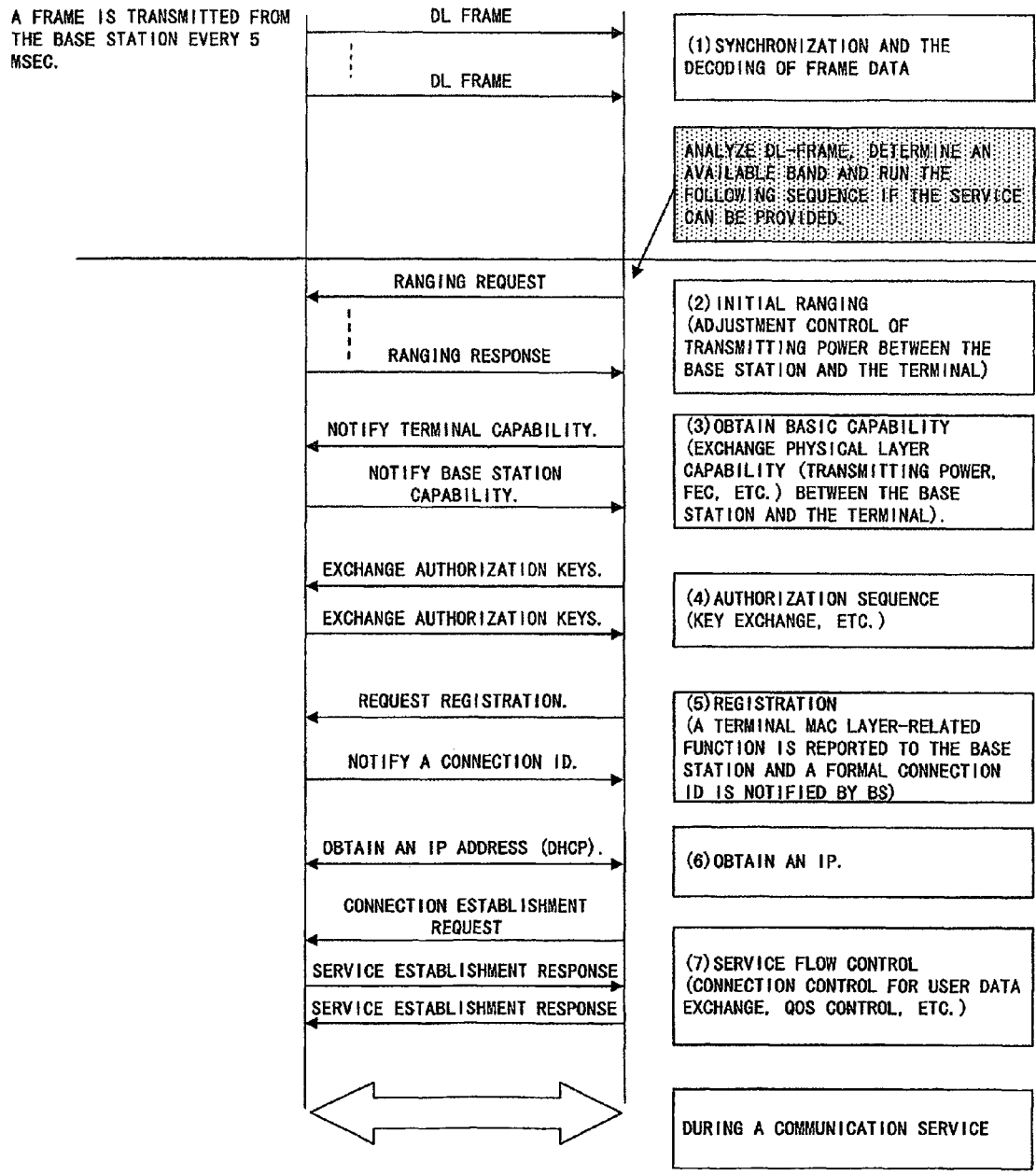
FIG. 10 is a sequence chart explaining network entry sequence according to the preferred embodiment.

FIG. 10 is a sequence chart explaining network entry sequence according to the preferred embodiment.

The base station transmits a frame to terminals in its own cell. Firstly, a down link frame (DL) is transmitted. Upon receipt of the DL frame, each terminal performs synchronization (synchronization of the base station and the terminal) (1) and the decoding of the frame data is enabled. Then, according to the preferred embodiment, the DL frame is analyzed, available bands are determined and it is determined whether the service requested by the terminal is available. If it is available, the following sequence is run. If it is unavailable, communications with the base station are not conducted.

Firstly, an initial ranging process is performed between the terminal and the base station (2). This is an adjustment control process of transmitting power between the base station and a terminal and the like. Then, basic capability is obtained between the base station and the terminal (3). Specifically, the capability (transmitting power, FEC, etc.) of physical layers between the base station and the terminal are exchanged with each other. Then, each of the base station and the terminal performs an authorization sequence in order to decode the data transmitted from the opposite party (4) and exchange their decoding keys. Then, the terminal notifies the base station of its terminal MAC layer-related function and is notified of a formal connection ID by the base station (5). Then, the terminal obtains an IP address (6) and performs service flow control, such as connection control for user data exchange, QOS control and the like (7) to start a communication service.

Thus, in the preferred embodiment the sequence after (2) is run only if the terminal can receive its desired service. Therefore, if the desired service cannot be received, the sequence after (2) is not run uselessly and no extra power is consumed.

Figure 11A:
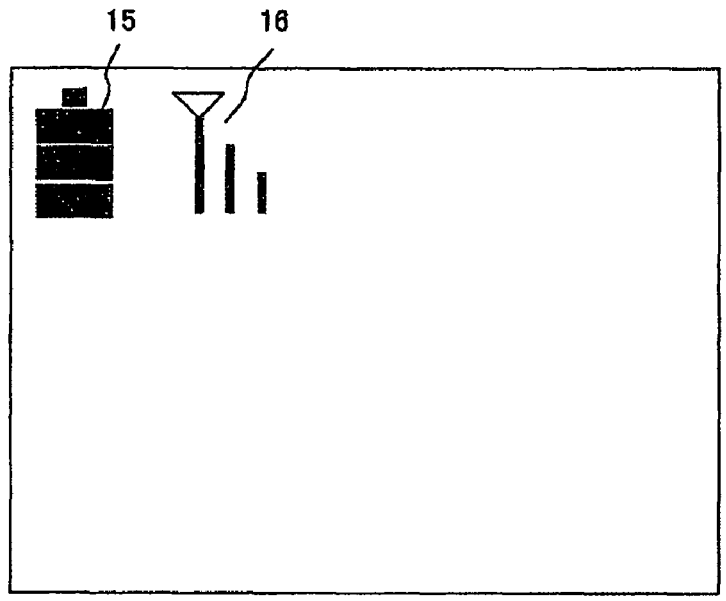
FIGS. 11A and B show a display example on the display screen of the mobile terminal.

FIGS. 11A and B show display examples on the display screen of the mobile terminal.

Figure 11B:
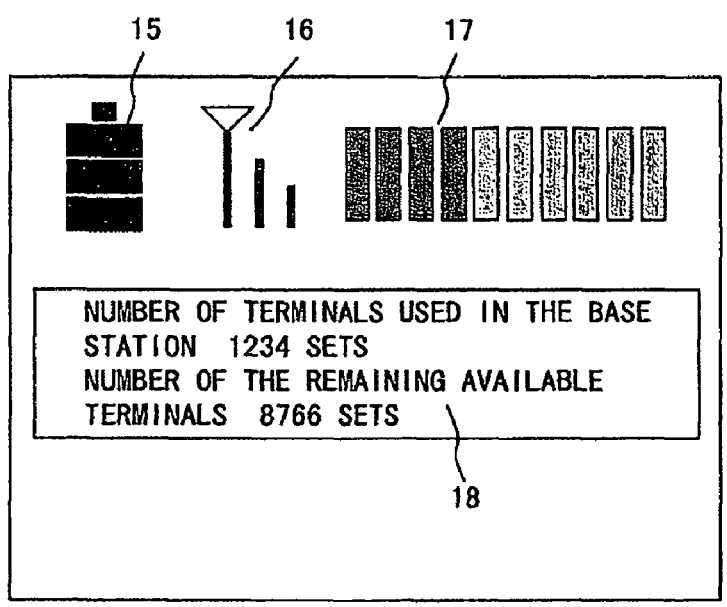

FIG. 11A shows a display example on the display screen of a traditional mobile terminal. Traditionally, as the operation of a mobile terminal only a charging state 15 and wave receiving strength 16 are basically displayed. In the embodiment, as shown in FIG. 11B, the amount of band used in the base station 17 and the number of terminals currently used in the base station 18 are also displayed in addition to the charging state 15 and wave receiving strength 16. The number of terminals 18 is the total number of currently used terminals obtained by adding the number of used terminals in DL-burst in all bursts.

What is claimed is:

1. A communication device for conducting radio communications with a base station, comprising:
a use bandwidth setting unit to set a desired bandwidth;
a free bandwidth calculation unit to calculate free bandwidth using full bandwidth used by the base station and bandwidth used to communicate with terminals accommodated in the base station, which are extracted from a header of down link data from the base station, the down link data being transmitted with a regular interval;
a determination unit to determine whether the desired bandwidth is equal to or less than the free bandwidth; and
a registration unit to register the desired bandwidth in a network in the base station when the desired bandwidth is equal to or less than the free bandwidth,
wherein when the down link data is received from the base station, the communication device conducts a synchronization process and a decoding process of the down link data, and
wherein when the desired bandwidth is registered, after the synchronization process and the decoding process, the communication device starts an origination sequence including an adjustment control process of transmitting power between the base station and the communication device to communicate with the base station and when the desired bandwidth is not available, the communication device cuts a connection between the communication device and the base station without starting the origination sequence.

2. The communication device according to claim 1, wherein radio communications with the base station are conducted using an orthogonal frequency division multiplexing method.

3. The communication device according to claim 2, wherein a bandwidth used by the base station comprises a plurality of bands each with a different encoding method.

4. The communication device according to claim 3, wherein the used bandwidth is determined by adding a product of number of used sub-channels and number of symbols for the plurality of bandwidth.

5. The communication device according to claim 2, wherein the orthogonal frequency division multiplexing method is utilized with a WiMAX communication system.

6. The communication device according to claim 1, further comprising:
a terminal number acquisition unit to obtain number of terminals accommodated in the base station from a header of a down link data from the base station; and
a notification unit to notify a user of the number of terminals and the used bandwidth.

7. The communication device according to claim 1, wherein when the desired bandwidth is larger than the free bandwidth, providing an indication that the desired bandwidth is unavailable.

8. The communication device according to claim 1, wherein the used bandwidth is averaged for a prescribed time.

9. A control method of a communication device for conducting radio communications with a base station, comprising:
setting a desired bandwidth;
calculating free bandwidth using full bandwidth used by the base station and bandwidth currently used to communicate with terminals accommodated in the base station, which are extracted from a header of down link data from the base station, the down link data being transmitted with a regular interval;
determining whether the desired bandwidth is equal to or less than the free bandwidth;
registering the desired bandwidth in a network in the base station when the desired bandwidth is equal to or less than the free bandwidth;
conducting a synchronization process and a decoding process of the down link data when the down link data is received from the base station;
starting, when the desired bandwidth is registered, an origination sequence to communicate with the base station after the synchronization process and the decoding process;
cutting, when the desired bandwidth is not registered, a connection between the communication device and the base station without starting the origination sequence.

10. The method according to claim 9, wherein calculating free bandwidth further comprises calculating an average of the used bandwidth over a given time.

11. The method according to claim 10, wherein the given time is several seconds.

12. The method according to claim 9 further comprising:
providing an indication that the desired bandwidth is unavailable when the desired bandwidth is larger than the free bandwidth.

13. The method of claim 9, wherein calculating free bandwidth includes obtaining a number of terminals accommodated in the base station from the header of a down link data from the base station.

14. The method of claim 13 further comprising:
displaying the number of terminals accommodated in the base station and the bandwidth used to communicate with terminals.

15. The method of claim 9, wherein setting a desired bandwidth includes setting a plurality of bands with a differing encoding method.

* * * * *